US012283232B2

(12) United States Patent
Wu

(10) Patent No.: US 12,283,232 B2
(45) Date of Patent: Apr. 22, 2025

(54) LUMINANCE COMPENSATION CIRCUITS, DRIVE BACKPLANES, AND LUMINANCE COMPENSATION METHODS

(71) Applicant: Guangzhou China Star Optoelectronics Semiconductor Display Technology Co., LTd., Guangdong (CN)

(72) Inventor: Wei Wu, Guangdong (CN)

(73) Assignee: Guangzhou China Star Optoelectronics Semiconductor Display Technology Co., LTd., Guangzhou (CN)

( * ) Notice: Subject to any disclaimer, the term of this patent is extended or adjusted under 35 U.S.C. 154(b) by 0 days.

(21) Appl. No.: 18/531,822

(22) Filed: Dec. 7, 2023

(65) Prior Publication Data

US 2024/0194131 A1 Jun. 13, 2024

(30) Foreign Application Priority Data

Dec. 7, 2022 (CN) ........................ 202211561378.X

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01); *G09G 2310/08* (2013.01); *G09G 2320/0233* (2013.01); *G09G 2360/145* (2013.01)

(58) Field of Classification Search
CPC .... G09G 3/32; G09G 3/2096; G09G 2310/08; G09G 2320/0233; G09G 2360/145; G09G 3/3208; G09G 3/3233
See application file for complete search history.

(56) References Cited

U.S. PATENT DOCUMENTS

| | | | | |
|---|---|---|---|---|
| 2005/0140611 A1* | 6/2005 | Shih | ..................... | G09G 3/3233 345/82 |
| 2010/0013811 A1* | 1/2010 | Ahn | ..................... | G09G 3/2003 345/207 |
| 2019/0066555 A1* | 2/2019 | Gu | ......................... | G09G 3/006 |
| 2020/0212137 A1* | 7/2020 | Wang | ................. | H10K 59/1213 |
| 2022/0198977 A1* | 6/2022 | Kim | ......................... | G09G 3/20 |

FOREIGN PATENT DOCUMENTS

| | | |
|---|---|---|
| CN | 107863065 A | 3/2018 |
| CN | 108649059 A | 10/2018 |
| CN | 108877653 A | 11/2018 |
| CN | 211376153 U | 8/2020 |
| CN | 112509515 A | 3/2021 |

OTHER PUBLICATIONS

Chinese Office Action issued in corresponding Chinese Patent Application No. 202211561378.X dated Feb. 14, 2025, pp. 1-9.

* cited by examiner

*Primary Examiner* — Premal R Patel
(74) *Attorney, Agent, or Firm* — PV IP PC; Wei Te Chung

(57) ABSTRACT

A luminance compensation circuit includes: a light-emitting circuit; a luminance detector electrically connected to a first power terminal, a second power terminal, and a first node; a reading device electrically connected to the first node; and a timing controller electrically connected to the reading device and the light-emitting circuit.

17 Claims, 6 Drawing Sheets

LUMINANCE COMPENSATION CIRCUITS, DRIVE BACKPLANES, AND LUMINANCE COMPENSATION METHODS

CROSS-REFERENCE TO RELATED APPLICATION

This application claims priority to Chinese Patent Application No. 202211561378.X, filed on Dec. 7, 2022, the disclosure of which is incorporated herein by reference in its entirety.

TECHNICAL FIELD

The present disclosure relates to display technologies, and in particular, to luminance compensation circuits, drive backplanes, and luminance compensation methods.

BACKGROUND

Mini/Micro Light Emitting Diode (MLED) has become one hot spot in future display technology due to its fast response, high color gamut, high pixel density, low energy consumption, etc. MLED display is considered as the next generation display solution, which has a display effect significantly better than LED display. However, production yield and reliability of MLED may limit development of MLED. For example, poor luminance uniformity and stability of the MLED may result in poor production yield and product reliability of an array substrate based MLED.

In order to cope with temporal and spatial unevenness of the MLED display luminance, the MLED may be designed with a compensation function to improve the luminance uniformity and stability thereof.

SUMMARY

One or more embodiments of the present disclosure provide a luminance compensation circuit, including:

- a light-emitting circuit configured to receive a data signal and emit light under an action of the data signal;
- a luminance detector electrically connected to a first power terminal, a second power terminal, and a first node, and configured to control a magnitude of a voltage at the first node based on luminance of the light-emitting circuit and a first voltage at the first power terminal, and store the magnitude of the voltage;
- a reading device electrically connected to the first node to read the magnitude of the voltage from the luminance detector; and
- a timing controller electrically connected to the reading device and the light-emitting circuit, and configured to compensate for the data signal based on the magnitude of the voltage provided by the reading device.

One or more embodiments of the present disclosure provide a drive backplane including the luminance compensation circuit as described above.

One or more embodiments of the present disclosure provide a luminance compensation method for a drive backplane. The drive backplane includes the luminance compensation circuit as described above. The luminance compensation method includes:

- in a data signal writing stage, the light-emitting circuit receiving the data signal and emitting the light under the action of the data signal;
- in a luminance detection stage, controlling and storing, by the luminance detector, a voltage of the first node based on luminance of the light-emitting circuit and a voltage of the first power terminal;
- in a reading stage, reading the voltage of the first node and outputting the voltage of the first node to the timing controller by the reading device;
- in a compensation stage, the timing controller compensating for the data signal based on the magnitude of the voltage provided by the reading device.

DETAILED DESCRIPTION

Some embodiments of the present disclosure will be described in detail below in connection with the accompanying drawings. The embodiments are described for illustrative purposes only and are not intended to limit the present disclosure.

In addition, the terms “first”, “second”, etc. in the description and claims of this disclosure are used to distinguish different objects, rather than describing a specific sequence. The terms “include” and “have” and any variations thereof are intended to cover non-exclusive inclusion. Since a source and a drain of the transistor used in this disclosure are symmetrical, the source and drain are interchangeable. According to a shape in the attached figure, a middle terminal of the transistor is a gate, a signal input terminal is the source, and an output terminal is the drain.

Figure 1:
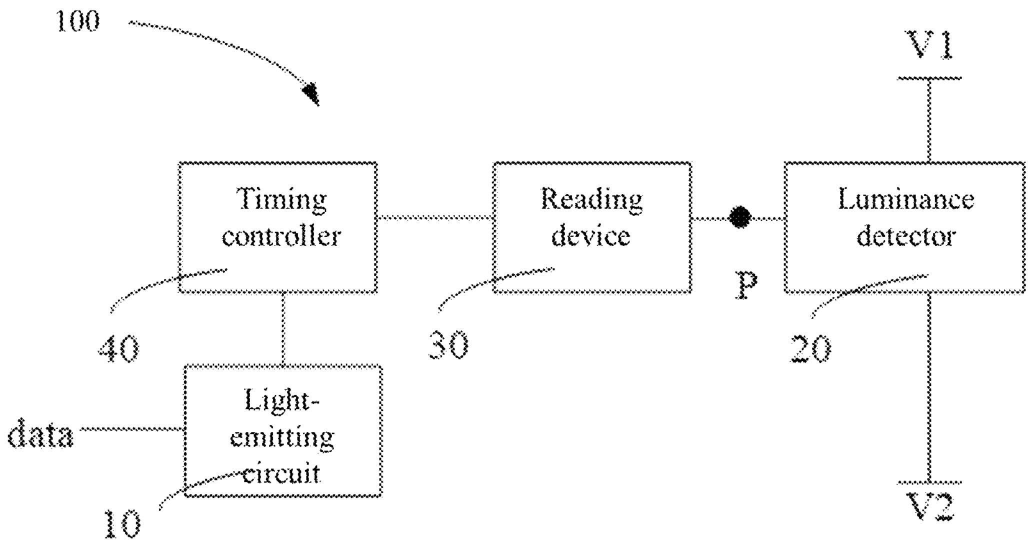
FIG. 1 is a structural diagram of a luminance compensation circuit according to some embodiments of the present disclosure.

Please refer to FIG. 1. FIG. 1 is a structural diagram of a luminance compensation circuit according to some embodiments of the present disclosure. As shown in FIG. 1, the luminance compensation circuit 100 includes a light-emitting circuit 10, a luminance detector 20, a reading device 30, and a timing controller 40.

The light-emitting circuit 10 is configured to receive a data signal data and emit light under the action of the data signal data.

The luminance detector 20 is electrically connected to a first power terminal V1, a second power terminal V2, and a first node P, respectively. That is, the luminance detector 20 is connected in series in a loop formed by the first power terminal V1 and the second power terminal V2. The luminance detector 20 is used to control and store a magnitude of a voltage output from the first power terminal V1 to the first node P based on luminance of the light-emitting circuit 10.

It is worth mentioning that voltage signals provided by the first power terminal V1 and the second power terminal V2 are different. That is, when the first power terminal V1 provides a high-voltage power signal, the second power terminal V2 may provide a low-voltage power signal; or when the first power terminal V1 provides a low-voltage power signal, the second power terminal V2 may provide a high-voltage power signal.

The reading device 30 is electrically connected to the first node P and the timing controller 40. The reading device 30 is used to read the magnitude of the voltage at the first node P and output the read magnitude of the voltage to the timing controller 40.

The timing controller 40 is electrically connected to the light-emitting circuit 10 and is used to compensate for the data signal data provided to the light-emitting circuit 10 based on the magnitude of the voltage (i.e., the voltage at the first node P) provided by the reading device 30.

In the luminance compensation circuit 100 provided in some embodiments, the luminance detector 20 is set to convert luminous intensity of the light-emitting circuit 10 into the corresponding voltage value of the first node P, and the timing controller 40 compensates the data signal data of the light-emitting circuit 10 based on the voltage of the first node P, thereby improving display uniformity of the light-emitting circuit 10.

Figure 2:
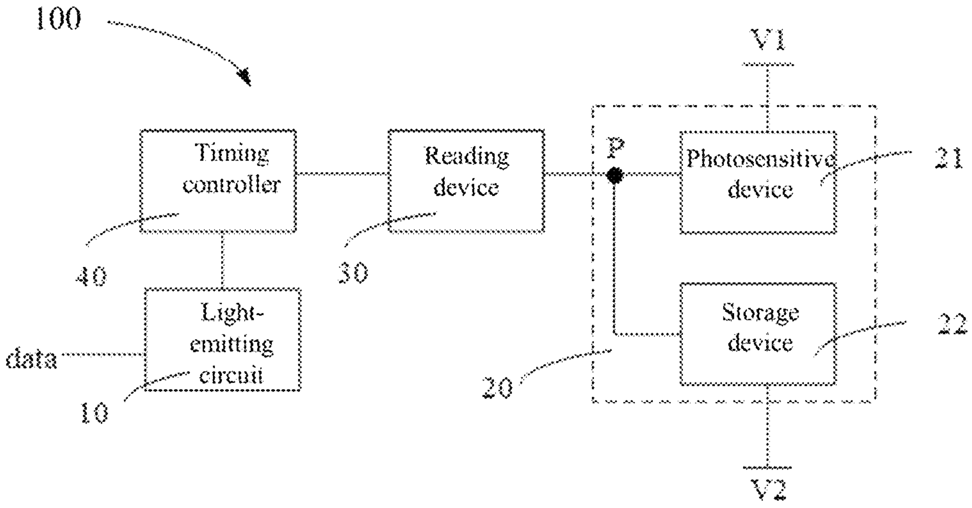
FIG. 2 is a structural diagram of another luminance compensation circuit according to some embodiments of the present disclosure.

In some embodiments of the present disclosure, please refer to FIG. 2. FIG. 2 is a structural diagram of another luminance compensation circuit according to some embodiments of the present disclosure. As shown in FIG. 2, in the luminance compensation circuit 100, the luminance detector 20 includes a photosensitive device 21 and a storage device 22.

The photosensitive device 21 is electrically connected to the first power terminal V1 and the first node P, respectively. The photosensitive device 21 is used to control the voltage output from the first power terminal V1 to the first node P based on the luminance of the light-emitting circuit 10.

The storage device 22 is electrically connected to the first node P and the second power terminal V2, respectively. The storage device 22 is used to store the voltage of the first node P for reading by the reading device 30.

Figure 3:
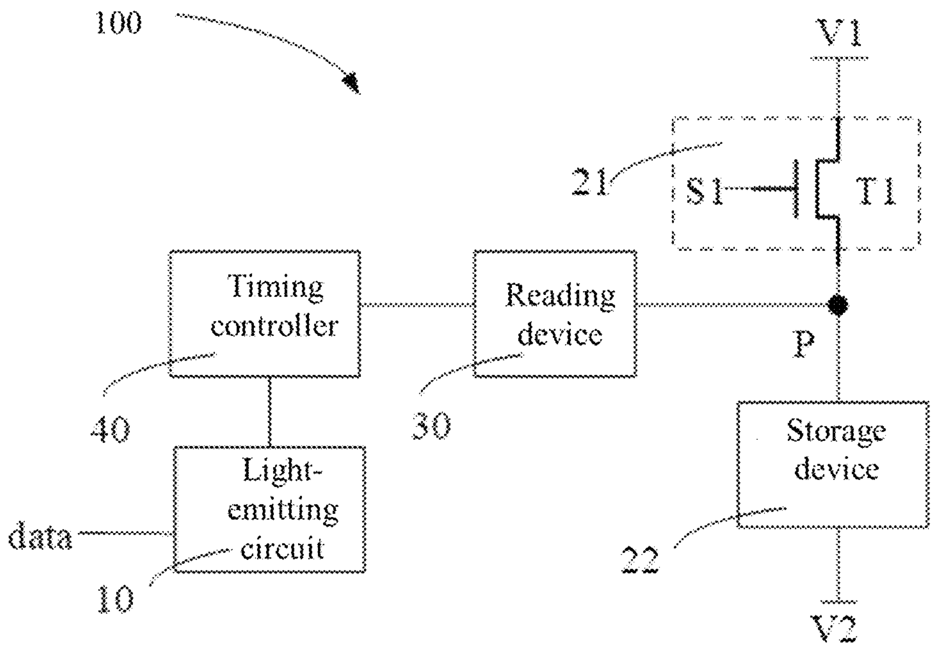
FIG. 3 is a structural diagram of still another luminance compensation circuit according to some embodiments of the present disclosure.

In some embodiments of the present disclosure, please refer to FIG. 3. FIG. 3 is a structural diagram of still another luminance compensation circuit according to some embodiments of the present disclosure. As shown in FIG. 3, in the luminance compensation circuit 100, the photosensitive device 21 includes a photosensitive transistor T1.

A gate of the photosensitive transistor T1 is electrically connected to a first control terminal S1, one of a source and a drain of the photosensitive transistor T1 is electrically connected to the first power terminal V1, and an other one of the source and the drain of the photosensitive transistor T1 is electrically connected to the first node P.

When the gate of the photosensitive transistor T1 is connected to a first control signal provided by the first control terminal S1, and one of the source and drain of the photosensitive transistor T1 is connected to a first power signal provided by the first power terminal V1, the photosensitive transistor T1 is turned off. The photosensitive transistor T1 may generate photo-generated carriers under the action of light due to its light sensing function, which generates a photo-generated current flowing from one of the source and drain of the photosensitive transistor T1 to the other one of the source and drain of the photosensitive transistor T1, thereby providing the current to the first node P. Different luminance results in different numbers of photo-generated carriers and different photo-generated currents. Therefore, when the luminous intensity of the light-emitting circuit 10 is different, the voltages at the first node P is different.

In some embodiments, the photosensitive transistor T1 may be manufactured at the same time as other transistors in the luminance detection circuit, which can simplify a manufacturing process of the luminance detection circuit and reduce a manufacturing cost.

Figure 4:
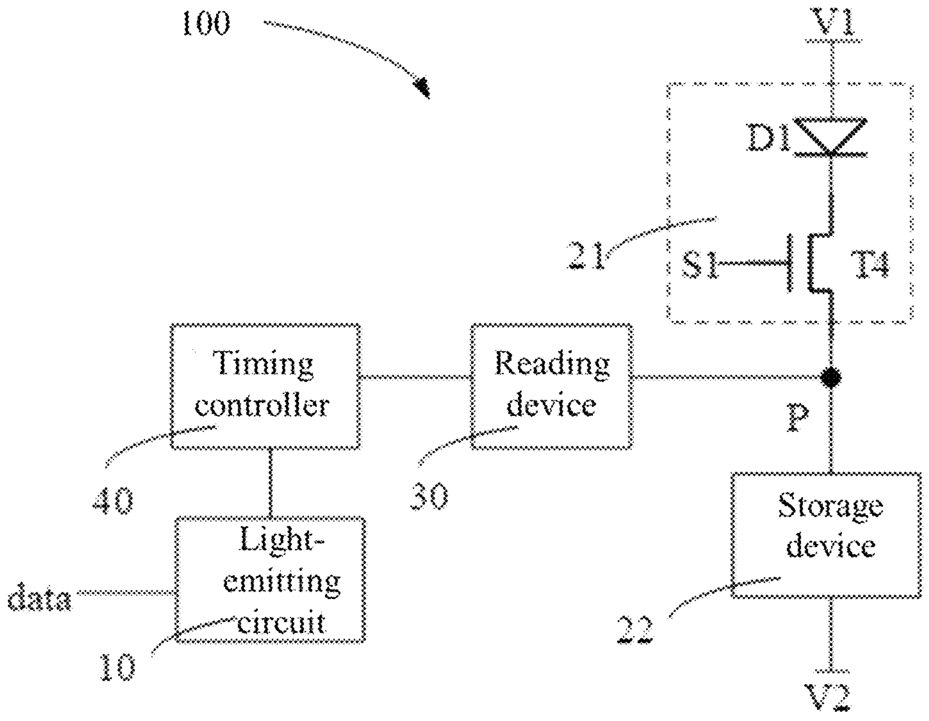
FIG. 4 is a structural diagram of still another luminance compensation circuit according to some embodiments of the present disclosure.

In some embodiments of the present disclosure, please refer to FIG. 4. FIG. 4 is a structural diagram of still another luminance compensation circuit according to some embodiments of the present disclosure. The luminance compensation circuit 100 provided in the embodiments as shown in FIG. 4 differs from the luminance compensation circuit 100 provided in the previous embodiments in that the photosensitive device 21 includes a photodiode D1 and a third switching transistor T4.

A first terminal of the photodiode D1 is electrically connected to the first power terminal V1, and a second terminal of the photodiode D1 is electrically connected to one of a source and a drain of the third switching transistor T4.

A gate of the third switching transistor T4 is electrically connected to the first control terminal S1, and an other one of the source and the drain of the third switching transistor T4 is electrically connected to the first node P.

In some embodiments, the photodiode D1 has a light sensing function. The photodiode D1 generates a photo-generated current after receiving light from the light-emitting circuit 10. The gate of the third switching transistor T4 is turned on under a control of the first control signal provided by the first control terminal S1, and providing the photo-generated current provided by the photodiode D1 to the first node P. Therefore, when the luminous intensity of the light-emitting circuit 10 is different, the voltages at the first node P are different.

In order to prevent the photodiode D1 from operating unnecessarily and providing the photo-generated current to the first node P, in some embodiments, the third switching transistor T4 is set to control whether the photo-generated current is provided to the first node P.

Figure 5:
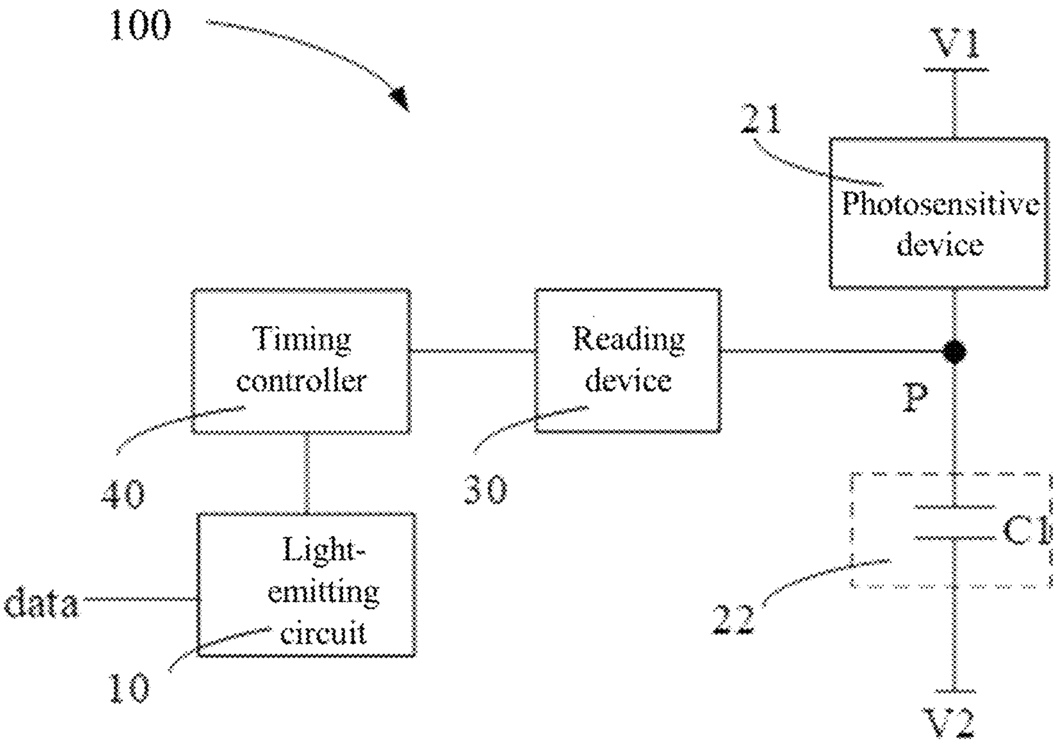
FIG. 5 is a structural diagram of still another luminance compensation circuit according to some embodiments of the present disclosure.

In some embodiments of the present disclosure, please refer to FIG. 5. FIG. 5 is a structural diagram of still another luminance compensation circuit according to some embodiments of the present disclosure. As shown in FIG. 5, in the luminance compensation circuit 100, the storage device 22 includes a first storage capacitor C1.

A first terminal of the first storage capacitor C1 is electrically connected to the first node P, and a second terminal of the first storage capacitor C1 is electrically connected to the second power terminal V2. The first storage capacitor C1 is used to store the photo-generated current provided to the first node P.

Figure 6:
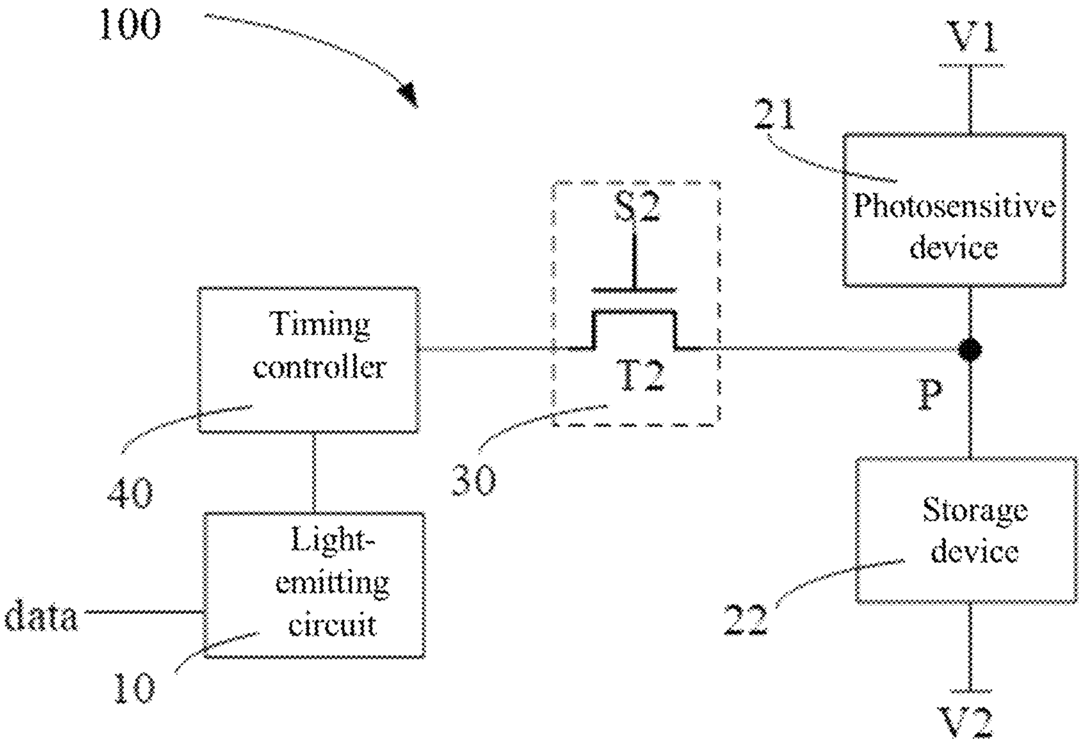
FIG. 6 is a structural diagram of still another luminance compensation circuit according to some embodiments of the present disclosure.

In some embodiments of the present disclosure, please refer to FIG. 6. FIG. 6 is a structural diagram of still another luminance compensation circuit according to some embodiments of the present disclosure. As shown in FIG. 6, in the luminance compensation circuit 100, the reading device 30 includes a first switching transistor T2.

A gate of the first switching transistor T2 is electrically connected to the second control terminal S2, one of a source and a drain of the first switching transistor T2 is electrically connected to the first node P, and an other one of the source and the drain of the first switching transistor 72 is electrically connected to the timing controller 40.

In some embodiments, the reading device 30 may also be other structures that make an input voltage and an output voltage in a same phase, such as a voltage follower. However, compared with a voltage follower or other structures with the same function, a function of the reading device 30 is implemented by a transistor with a switching function, which is conducive to manufacturing the reading device 30 with other components in the luminance compensation circuit 100 simultaneously thus simplifying a manufacturing process of the luminance detection circuit and reduce a manufacturing cost.

Figure 7:
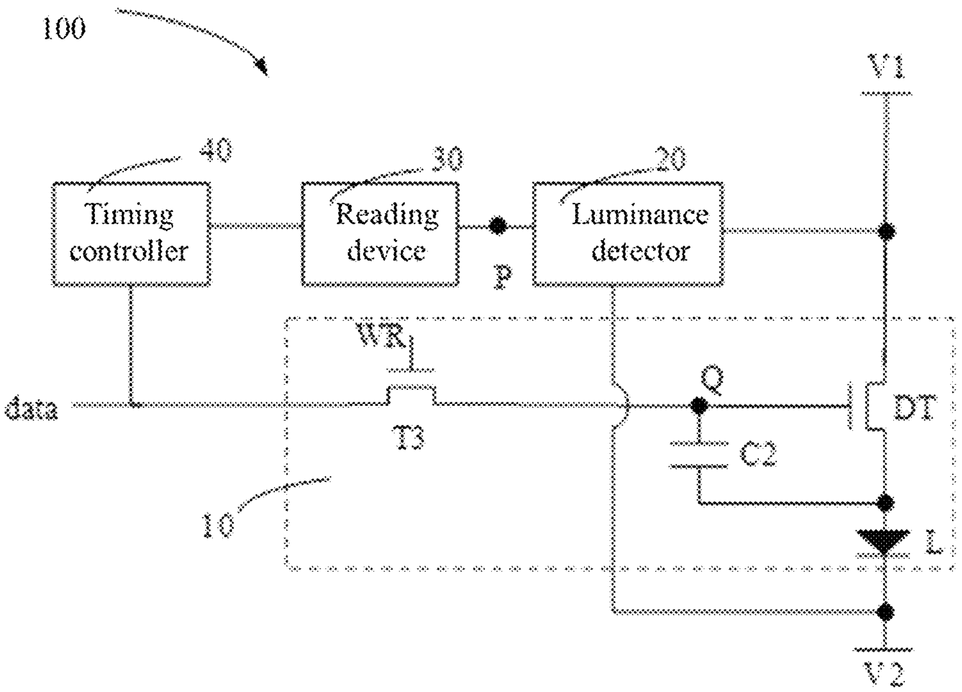
FIG. 7 is a structural diagram of still another luminance compensation circuit according to some embodiments of the present disclosure.

In some embodiments of the present disclosure, please refer to FIG. 7. FIG. 7 is a structural diagram of still another luminance compensation circuit according to some embodiments of the present disclosure. As shown in FIG. 7, in the luminance compensation circuit 100, the light-emitting circuit 10 includes a drive transistor DT, a second switching transistor T3, a second storage capacitor C2, and a light-emitting device L.

A gate of the drive transistor DT is electrically connected to a second node Q, and one of a source and a drain of the drive transistor DT is electrically connected to the first power terminal V1.

A gate of the second switching transistor T3 is electrically connected to a third control signal terminal WR, one of a source and a drain of the second switching transistor T3 is electrically connected to the second node Q, an other one of the source and the drain of the second switching transistor T3 is electrically connected to the data signal data and is electrically connected to the timing controller 40.

A first terminal of the second storage capacitor C2 is electrically connected to the second node Q, and a second terminal of the second storage capacitor C2 is electrically connected to the other one of the source and drain of the drive transistor DT.

A first terminal of the light-emitting device L is electrically connected to the other one of the source and drain of the drive transistor DT, and a second terminal of the light-emitting device L is electrically connected to the second power terminal V2. The light-emitting device L may include a Mini light-emitting diode (Mini-LED) or a Micro-LED. The light-emitting device L may include a plurality of Mini-LEDs connected in series or in parallel. The light-emitting device L may include a plurality of Mini-LEDs connected in series or in parallel.

It is worth mentioning that in some embodiments, the light-emitting circuit 10 and the luminance detector 20 are arranged in series in the loop formed by the first power terminal V1 and the second power terminal V2, that is, the light-emitting circuit 10 and the luminance detector 20 use a same high voltage power terminal and a same low voltage power terminal. Such arrangement is beneficial to reducing power terminals and reducing wiring space of the luminance compensation circuit 100. Of course, in some other embodiments provided in the present disclosure, the light-emitting circuit 10 is arranged in series in a loop formed by the third power terminal and the fourth power terminal. That is, one of the source and the drain of the drive transistor is connected to the third power terminal, the first terminal of the light-emitting device is electrically connected to the other one of the source and the drain of the drive transistor, and the second terminal of the light-emitting device is electrically connected to the fourth power terminal.

Figure 8:
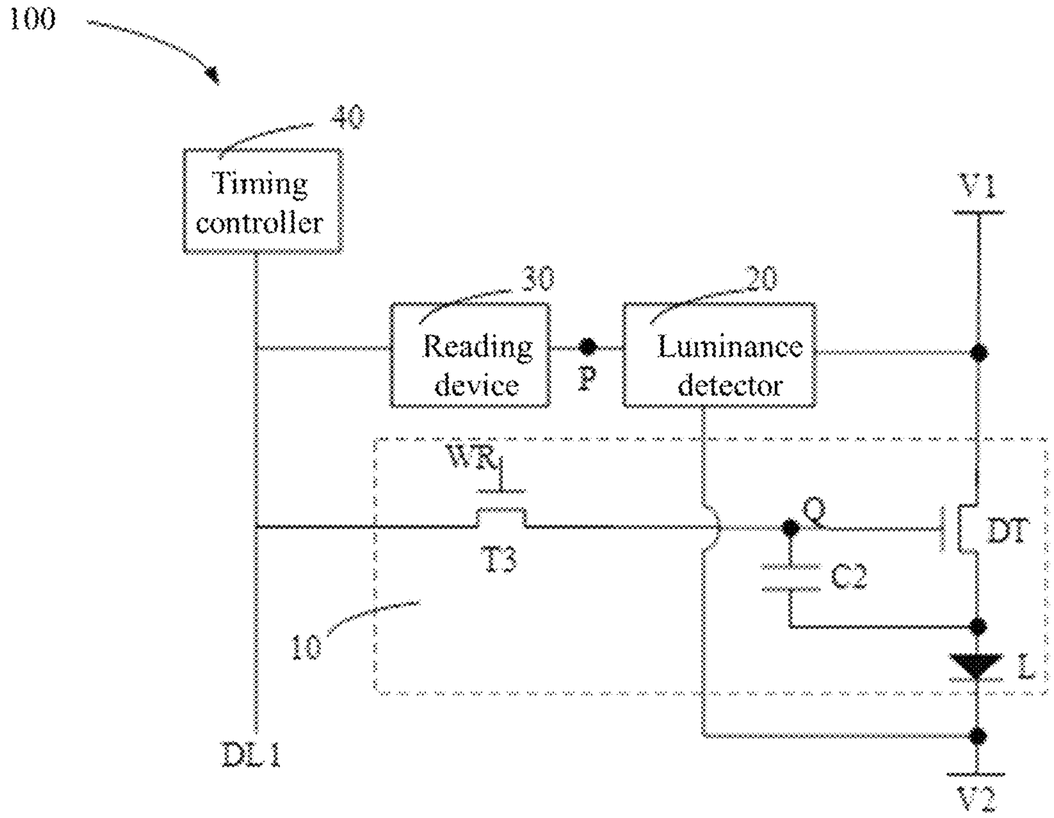
FIG. 8 is a structural diagram of still another luminance compensation circuit according to some embodiments of the present disclosure.

In some embodiments of the present disclosure, please refer to FIG. 8. FIG. 8 is a schematic structural diagram of still another luminance compensation circuit according to some embodiments of the present disclosure. As shown in FIG. 8, the luminance compensation circuit 100 of the embodiments further includes a read signal line DL1. The reading signal line DL1 is electrically connected to the reading device 30 and the light-emitting circuit 10. Specifically, the read signal line DL1 is used to read the voltage from the first node P provided by the reading device 30 and to provide the data signal to the light-emitting circuit 10.

In some embodiments, the signal line that provides the data signal to the light-emitting circuit 10 and the signal line that transmits the voltage of the first node P provided by the reading device 30 share the same read signal line DL1. The wiring space of the luminance compensation circuit 100 may be reduced.

Of course, in some other embodiments provided in the present disclosure, the luminance compensation circuit further includes the read signal line and the data signal line. The read signal line is electrically connected to the reading device, and is used to read the voltage of the first node P. The data signal line is electrically connected to the light-emitting circuit and is used to provide the data signal to the light-emitting circuit.

In addition, some embodiments of the present disclosure further provide a drive backplane. The drive backplane provided by the present disclosure includes any of the luminance compensation circuits described above.

In the drive backplane provided in the embodiments, by integrating the luminance compensation circuit provided in those embodiments on the drive backplane, the luminance detector converts the luminous intensity of the light-emitting circuit into a corresponding voltage and the timing controller compensates the light-emitting circuit based on the corresponding voltage, so as to improve the luminance uniformity within the drive backplane.

Figure 9:
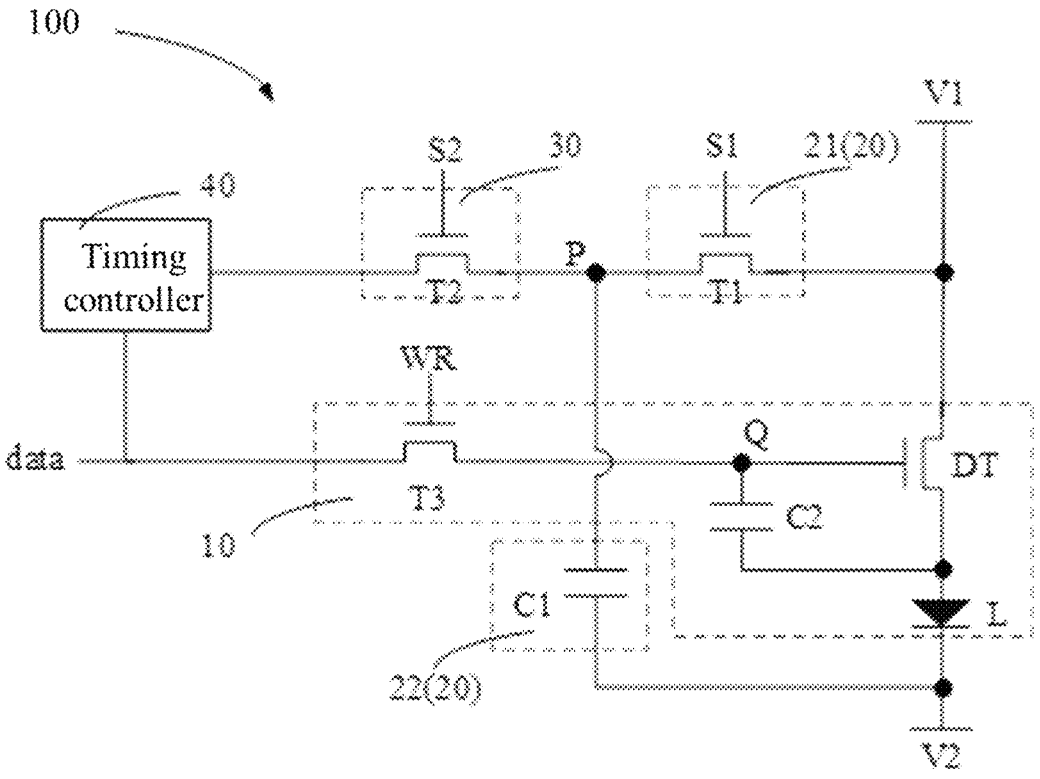
FIG. 9 is a schematic diagram of a circuit structure of a luminance compensation circuit according to some embodiments of the present disclosure.

Please refer to FIG. 9. FIG. 9 is a schematic diagram of a circuit structure of a luminance compensation circuit according to some embodiments of the present disclosure. As shown in FIG. 9, the luminance compensation circuit 100 includes a light-emitting circuit 10, a luminance detector 20, a reading device 30, and a timing controller 40.

The light-emitting circuit 10 includes a drive transistor DT, a second switching transistor T3, a second storage capacitor C2, and a light-emitting device L. The luminance detector 20 includes a photosensitive device 21 and a storage device 22. The photosensitive device 21 includes a photosensitive transistor T1, the storage device 22 includes a first storage capacitor C1. The reading device 30 includes a second switching transistor T3.

Specifically, a gate of the drive transistor DT is electrically connected to a second node Q, one of a source and a drain of the drive transistor DT is electrically connected to a first power terminal V1, and an other one of the source and the drain of the drive transistor DT is electrically connected to a first terminal of the light-emitting device L. A first terminal of the second storage capacitor C2 is electrically connected to the second node Q, and a second terminal of the second storage capacitor C2 is electrically connected to the other one of the source and the drain of the drive transistor DT. A gate of the second switching transistor T3 is electrically connected to a third control signal terminal S3, and one of a source and a drain of the second switching transistor T3 is electrically connected to the second node Q, and an other one of the source and the drain of the second switching transistor T3 is connected to the data signal data. A second terminal of the light-emitting device L is electrically connected to a second power terminal V2.

Specifically, a gate of the photosensitive transistor T1 is electrically connected to the first control terminal S1, one of a source and a drain of the photosensitive transistor T1 is electrically connected to the first power terminal V1, and an other one of the source and the drain of the photosensitive transistor T1 is electrically connected to the first node P. A first terminal of the first storage capacitor C1 is electrically connected to the first node P, and a second terminal of the first storage capacitor C1 is electrically connected to the second power terminal V2.

Specifically, a gate of the first switching transistor T2 is electrically connected to a second control terminal S2, and one of a source and a drain of the first switching transistor T2 is electrically connected to the first node P, and an other one of the source and the drain of the first switching transistor 72 is electrically connected to the timing controller 40.

It should be understood that, for illustration, the photosensitive transistor T1, the first switching transistor T2, and the second switching transistor T3 shown in FIG. 9 are all N-type transistors. Of course, this should not be used as a limitation of the embodiments. In some other embodiments provided in the present disclosure, one or more of the drive transistor DT, the photosensitive transistor T1, the first switching transistor T2, the second switching transistor T3 may also be P-type transistors.

Figure 10:
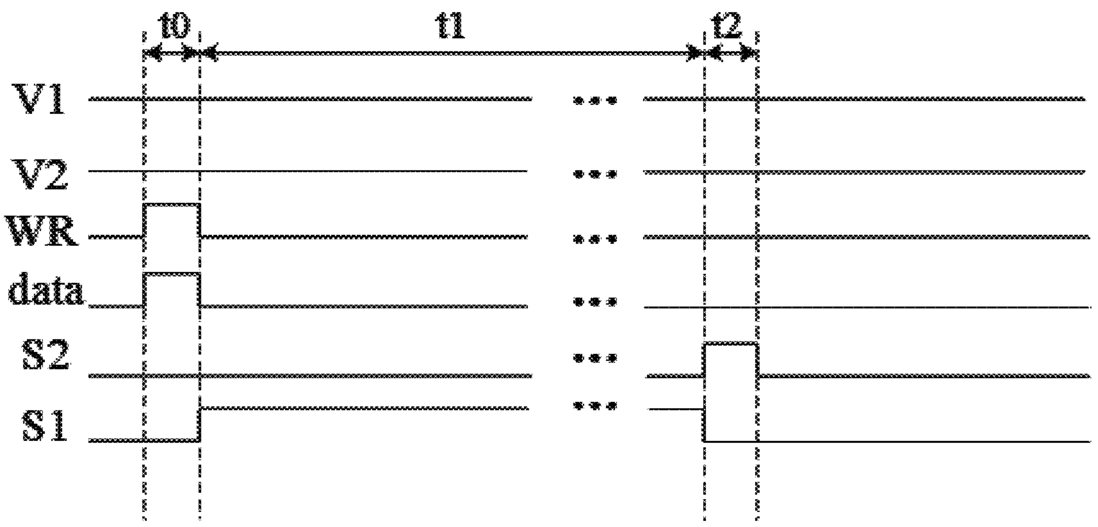
FIG. 10 is a control timing diagram of the luminance compensation circuit shown in FIG. 9.

Please refer to FIG. 9 and FIG. 10. FIG. 10 is a control timing diagram of the luminance compensation circuit shown in FIG. 9. As shown in FIG. 10, the luminance compensation circuit 100 specifically includes: a data signal writing stage t0, a light emitting stage t1, and a luminance detection stage t2.

In the data signal writing phase t0, the first control terminal S1 and the second control terminal S2 provide a low-level signal, and the third control terminal WR provides a high-level signal.

In the light-emitting stage t1, the first control terminal S1 provides a high-potential signal, the second control terminal S2 and the third control terminal WR provide a low-potential signal, and the data signal data is a low-potential signal.

In the luminance detection stage t2, the second control terminal S2 provides a high-potential signal, the first control terminal S1 and the third control terminal WR provide low-potential signals, and the data signal data is a high-potential signal.

The first power terminal V1 provides a constant-voltage and high potential signal, and the second power terminal V2 provides a constant-voltage and low potential signal.

Figure 11:
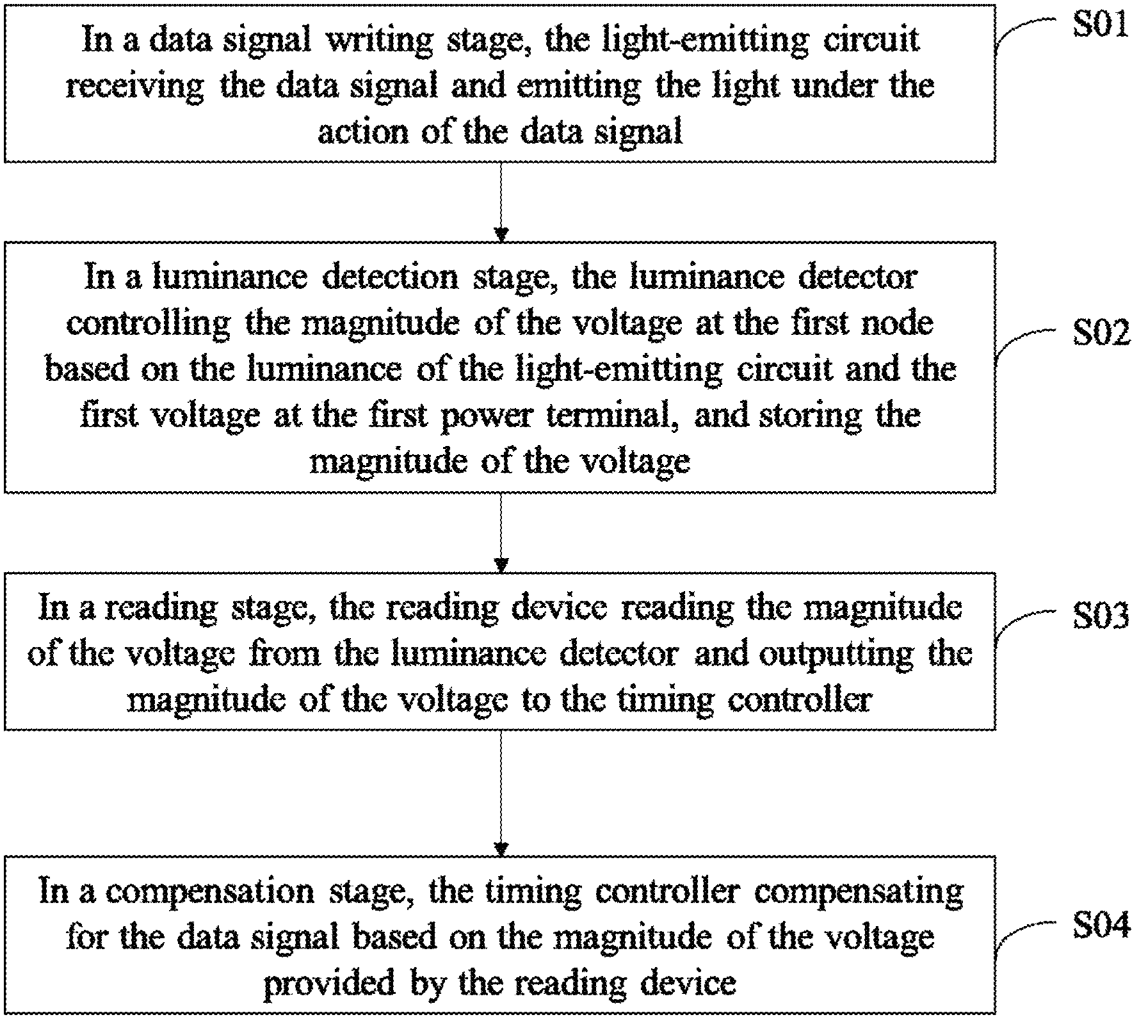
FIG. 11 is a schematic flowchart of a luminance compensation method for a drive backplane according to some embodiments of the present disclosure.

Please refer to FIG. 11. FIG. 11 is a schematic flowchart of a luminance compensation method for a drive backplane according to some embodiments of the present disclosure. As shown in FIG. 11, the method specifically includes the following operations:

in operation S01, in a data signal writing stage, the light-emitting circuit receiving the data signal and emitting the light under the action of the data signal;

in operation S02, in the luminance detection stage, the luminance detector controls the magnitude of the voltage at the first node based on the luminance of the light-emitting circuit and the first voltage at the first power terminal, and storing the magnitude of the voltage;

in operation S03, in the reading stage, the reading device reads the magnitude of the voltage from the luminance detector and outputs the magnitude of the voltage to the timing controller; and in operation S04, in a compensation stage, the timing controller compensates for the data signal based on the magnitude of the voltage provided by the reading device.

The luminance compensation methods of the drive backplanes provided by the present disclosure converts the luminous intensity of the light-emitting circuit into a corresponding voltage by controlling the luminance detector and controls the timing controller to compensate the light-emitting circuit based on the corresponding voltage, thereby improving the luminance uniformity within the drive backplane.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A luminance compensation circuit, comprising:

a light-emitting circuit configured to receive a data signal and emit light under an action of the data signal;

a luminance detector electrically connected to a first power terminal, a second power terminal, and a first node, and configured to control a magnitude of a voltage at the first node based on luminance of the light-emitting circuit and a first voltage at the first power terminal, and store the magnitude of the voltage wherein the luminance detector comprises:

a photosensitive device electrically connected to the first power terminal and the first node, and configured to control the magnitude of the voltage based on the luminance of the light-emitting circuit, and a storage device electrically connected to the first node and the second power terminal, and configured to store the magnitude of the voltage;

a reading device electrically connected to the first node to read the magnitude of the voltage from the luminance detector; and a timing controller electrically connected to the reading device and the light-emitting circuit, and configured to compensate for the data signal based on the magnitude of the voltage provided by the reading device.

2. The luminance compensation circuit according to claim 1, wherein the photosensitive device comprises a photosensitive transistor having a gate, a source and a drain; and the gate is electrically connected to a first control terminal, one of the source and the drain is electrically connected to the first power terminal, and an other one of the source and the drain is electrically connected to the first node.

3. The luminance compensation circuit according to claim 1, wherein the storage device comprises a first storage capacitor having a first terminal electrically connected to the first node and a second terminal electrically connected to the second power terminal.

4. The luminance compensation circuit according to claim 1, wherein the reading device comprises a first switching transistor having a gate, a source and a drain; and the gate is electrically connected to a second control terminal, one of the source and the drain is electrically connected to the first node, and an other one of the source and the drain is electrically connected to the timing controller.

5. The luminance compensation circuit according to claim 1, wherein the light-emitting circuit comprises a drive transistor, a second switching transistor, a second storage capacitor, and a light-emitting device;

a gate of the drive transistor is electrically connected to a second node, one of a source of the drive transistor and a drain of the drive transistor is electrically connected to the first power terminal, and an other one of the source of the drive transistor and the drain of the drive transistor is electrically connected to a first terminal of the light-emitting device;

a gate of the second switching transistor is electrically connected to a third control signal terminal, one of a source of the second switching transistor and a drain of the second switching transistor is electrically connected to the second node, and an other one of the source of the second switching transistor and the drain of the second switching transistor is configured to receive the data signal;

the second storage capacitor has a first terminal electrically connected to the second node, and a second terminal electrically connected to the first terminal of the light-emitting device; and a second terminal of the light-emitting device is electrically connected to the second power terminal.

6. The luminance compensation circuit according to claim 1, further comprising:

a read signal line for reading the magnitude of the voltage provided by the reading device; and a data signal line for providing the data signal to the light-emitting circuit.

7. The luminance compensation circuit according to claim 1, further comprising:

a read signal line for reading the magnitude of the voltage provided by the reading device and providing the data signal to the light-emitting circuit.

8. The luminance compensation circuit according to claim 1, wherein the photosensitive device comprises a photodiode and a third switching transistor;

a first terminal of the photodiode is electrically connected to the first power terminal, and a second terminal of the photodiode is electrically connected to one of a source of the third switching transistor and a drain of the third switching transistor; and a gate of the third switching transistor is electrically connected to a first control terminal, and an other one of the source and the drain is electrically connected to the first node.

9. A drive backplane, comprising a luminance compensation circuit, wherein the luminance compensation circuit comprises:

a light-emitting circuit configured to receive a data signal and emit light under an action of the data signal;

a luminance detector electrically connected to a first power terminal, a second power terminal, and a first node, and configured to control a magnitude of a voltage at the first node based on luminance of the light-emitting circuit and a first voltage at the first power terminal, and store the magnitude of the voltage, wherein the luminance detector comprises:

a photosensitive device electrically connected to the first power terminal and the first node, and configured to control the magnitude of the voltage based on the luminance of the light-emitting circuit, and a storage device electrically connected to the first node and the second power terminal, and configured to store the magnitude of the voltage;

a reading device electrically connected to the first node to read the magnitude of the voltage from the luminance detector; and a timing controller electrically connected to the reading device and the light-emitting circuit, and configured to compensate for the data signal based on the magnitude of the voltage provided by the reading device.

10. The drive backplane according to claim 9, wherein the photosensitive device comprises a photosensitive transistor having a gate, a source and a drain; and the gate is electrically connected to a first control terminal, one of the source and the drain is electrically connected to the first power terminal, and an other one of the source and the drain is electrically connected to the first node.

11. The drive backplane according to claim 9, wherein the storage device comprises a first storage capacitor having a first terminal electrically connected to the first node and a second terminal electrically connected to the second power terminal.

12. The drive backplane according to claim 9, wherein the reading device comprises a first switching transistor having a gate, a source and a drain; and the gate is electrically connected to a second control terminal, one of the source and the drain is electrically connected to the first node, and an other one of the source and the drain is electrically connected to the timing controller.

13. The drive backplane according to claim 9, wherein the light-emitting circuit comprises a drive transistor, a second switching transistor, a second storage capacitor, and a light-emitting device;

a gate of the drive transistor is electrically connected to a second node, one of a source of the drive transistor and a drain of the drive transistor is electrically connected to the first power terminal, and an other one of the source of the drive transistor and the drain of the drive transistor is electrically connected to a first terminal of the light-emitting device;

a gate of the second switching transistor is electrically connected to a third control signal terminal, one of a source of the second switching transistor and a drain of the second switching transistor is electrically connected to the second node, and an other one of the source of the second switching transistor and the drain of the second switching transistor is configured to receive the data signal;

the second storage capacitor has a first terminal electrically connected to the second node, and a second terminal electrically connected to the first terminal of the light-emitting device; and a second terminal of the light-emitting device is electrically connected to the second power terminal.

14. The drive backplane according to claim 9, wherein the luminance compensation circuit further comprises:

a read signal line for reading the magnitude of the voltage provided by the reading device; and a data signal line for providing the data signal to the light-emitting circuit.

15. The drive backplane according to claim 9, wherein the luminance compensation circuit further comprises:

a read signal line for reading the magnitude of the voltage provided by the reading device and providing the data signal to the light-emitting circuit.

16. The drive backplane according to claim 9, wherein the photosensitive device comprises a photodiode and a third switching transistor;

a first terminal of the photodiode is electrically connected to the first power terminal, and a second terminal of the photodiode is electrically connected to one of a source of the third switching transistor and a drain of the third switching transistor; and a gate of the third switching transistor is electrically connected to a first control terminal, and an other one of the source and the drain is electrically connected to the first node.

17. A luminance compensation method for a drive backplane, wherein the drive backplane comprises a luminance compensation circuit;

the luminance compensation circuit comprises:

a light-emitting circuit configured to receive a data signal and emit light under an action of the data signal;

a luminance detector electrically connected to a first power terminal, a second power terminal, and a first node, and configured to control a magnitude of a voltage at the first node based on luminance of the light-emitting circuit and a first voltage at the first power terminal, and store the magnitude of the voltage, wherein the luminance detector comprises:

a photosensitive device electrically connected to the first power terminal and the first node, and configured to control the magnitude of the voltage based on the luminance of the light-emitting circuit, and a storage device electrically connected to the first node and the second power terminal, and configured to store the magnitude of the voltage;

a reading device electrically connected to the first node to read the magnitude of the voltage from the luminance detector; and a timing controller electrically connected to the reading device and the light-emitting circuit, and configured to compensate for the data signal based on the magnitude of the voltage provided by the reading device; and the luminance compensation method comprises:

in a data signal writing stage, the light-emitting circuit receiving the data signal and emitting the light under the action of the data signal;

in a luminance detection stage, the luminance detector controlling the magnitude of the voltage at the first node based on the luminance of the light-emitting circuit and the first voltage at the first power terminal, and storing the magnitude of the voltage;

in a reading stage, the reading device reading the magnitude of the voltage from the luminance detector and outputting the magnitude of the voltage to the timing controller; and in a compensation stage, the timing controller compensating for the data signal based on the magnitude of the voltage provided by the reading device.

* * * * *